(12) United States Patent
Meiners

(10) Patent No.: US 9,723,793 B2
(45) Date of Patent: Aug. 8, 2017

(54) CUTTING DEVICE FOR AGRICULTURAL HARVESTING MACHINES WITH PRESELECTING DEVICE FOR PRESELECTING GROUPS OF CUTTING KNIVES

(71) Applicant: Maschinenfabrik Bernard Krone GmbH, Spelle (DE)

(72) Inventor: Michael Meiners, Beesten (DE)

(73) Assignee: Maschinenfabrik Bernard Krone GmbH, Spelle (DE)

( * ) Notice: Subject to any disclaimer, the term of this patent is extended or adjusted under 35 U.S.C. 154(b) by 70 days.

(21) Appl. No.: 14/811,922

(22) Filed: Jul. 29, 2015

(65) Prior Publication Data
US 2016/0029567 A1    Feb. 4, 2016

(30) Foreign Application Priority Data
Jul. 30, 2014    (DE) .................... 20 2014 006 083 U

(51) Int. Cl.
*A01F 12/40*    (2006.01)
*A01F 29/09*    (2010.01)
(Continued)

(52) U.S. Cl.
CPC ............ *A01F 29/095* (2013.01); *A01D 90/04* (2013.01); *A01F 15/10* (2013.01); *A01F 29/01* (2013.01)

(58) Field of Classification Search
CPC ............... A01F 12/40; A01F 2015/107; A01F 2015/108; A01F 15/106; A01F 29/005; A01D 90/04; A01D 41/1243
See application file for complete search history.

(56) References Cited

U.S. PATENT DOCUMENTS 2,670,775 A * 3/1954 Elofson ............... A01F 12/40
239/650
3,005,637 A * 10/1961 Hetteen ............... A01F 12/40
241/101.2
(Continued)

FOREIGN PATENT DOCUMENTS

DE     32 13 199 C1    3/1983
DE     31 41 414 A1    5/1983
(Continued)

*Primary Examiner* — Árpád Fábián-Kovács
(74) *Attorney, Agent, or Firm* — Gudrun E. Huckett

(57) ABSTRACT

A cutting device for agricultural harvesters has a conveying channel and pivotably supported cutting knives arranged in a row on a frame. The cutting knives project in the cutting position into the conveying channel. A conveying member with conveying tines, rotatingly driven about a horizontal axis, interacts with the cutting knives for comminuting crop. Individual adjusting devices, each associated with one cutting knife, yieldingly support the cutting knives in the cutting position. A knife switching device is provided to move the cutting knives from the inoperative position into the cutting position. With a preselecting device a desired group of cutting knives can be selected that is pivoted into the cutting position upon activation of the knife switching device. The preselecting device is activatable with reduced force expenditure by eliminating resistances, caused by adjusting and connecting devices of the knife switching device, when preselecting the desired group of cutting knives.

10 Claims, 6 Drawing Sheets

(51) Int. Cl.
*A01F 29/01* (2006.01)
*A01D 90/04* (2006.01)
*A01F 15/10* (2006.01)

(56) References Cited

U.S. PATENT DOCUMENTS

| | | | | |
|---|---|---|---|---|
| 4,612,941 A | * | 9/1986 | Kunde | A01F 12/40 241/241 |
| 5,368,238 A | * | 11/1994 | Bergkamp | A01F 29/005 241/223 |
| 5,503,339 A | * | 4/1996 | Doppstadt | B02C 13/04 241/166 |
| 5,542,883 A | * | 8/1996 | Cruson | A01F 12/40 460/112 |
| 5,928,079 A | * | 7/1999 | Roberg | A01F 12/40 460/112 |
| 5,974,776 A | * | 11/1999 | Prellwitz | A01D 90/04 460/112 |
| 6,152,820 A | * | 11/2000 | Heidjann | A01F 12/40 460/112 |
| 6,594,983 B1 | | 7/2003 | Krone et al. | |
| 6,595,123 B2 | * | 7/2003 | Schrag | A01F 15/101 100/97 |
| 6,912,835 B1 | * | 7/2005 | Chabassier | A01D 90/04 241/243 |
| 7,252,587 B2 | * | 8/2007 | Viaud | A01D 90/04 460/109 |
| 7,584,594 B2 | * | 9/2009 | Viaud | A01F 15/106 56/341 |
| 7,770,371 B2 | * | 8/2010 | Lucot | A01D 90/04 56/131 |
| 7,867,072 B2 | * | 1/2011 | Lauwers | A01D 41/1243 460/112 |
| 2008/0290198 A1 | * | 11/2008 | Benes | A01F 12/40 241/88.4 |
| 2009/0272089 A1 | | 11/2009 | Lucot et al. | |

FOREIGN PATENT DOCUMENTS

| | | | |
|---|---|---|---|
| DE | 10 2012 007 896 A1 | 10/2013 | |
| EP | 2 653 025 A1 | 10/2013 | |

* cited by examiner

CUTTING DEVICE FOR AGRICULTURAL HARVESTING MACHINES WITH PRESELECTING DEVICE FOR PRESELECTING GROUPS OF CUTTING KNIVES

BACKGROUND OF THE INVENTION

The invention relates to a cutting device for agricultural harvesting machines, for example, loading trailers (pick-up trailers) or baling presses, for harvesting agricultural stalk crop or leaf crop such as grass or hay. The cutting device comprises a conveying channel and a plurality of cutting knives that, arranged in at least one row, are pivotably supported and project into the conveying channel in the cutting position. For comminuting the stalk crop, the cutting knives interact in the conveying channel with a conveying member that is provided with conveying tines and is rotatably driven about a horizontal axis that is oriented transversely to the travel and working direction. The cutting device further comprises adjusting devices that yieldingly support each individual cutting knife in the cutting position. The cutting device further comprises a preselecting device for selecting a group of cutting knives which are pivoted into the cutting position upon activation by a knife switching device.

Such cutting devices are known in practice in numerous configurations and comprises substantially a conveying member, driven in rotation about a horizontal axis and provided with conveying tines, which interacts with cutting knives that are projecting into the conveying channel for cutting the stalk or leaf crop that has been picked up by a pick-up device and for supplying the cut crop to a downstream loading space. In particular in case of baling presses for producing round or square crop bales, only a limited mounting space is available for installation of such cutting devices.

DE 31 41 414 A1 discloses a cutting device for a self-loading trailer in which each knife is supported by a springy and yielding knife lever in the cutting position so that in this way the knife can automatically give way when a stone or another foreign object is encountered. The knife levers are supported approximately with their center on a stationary bolt wherein the lever section which is facing the knife is engaging with a knife roller provided thereat a recess at the back of the knife and the other lever section is engaging a cam disk of the switching shaft downstream of the knife levers. For each knife lever, and thus for each knife, a cam disc is provided wherein the cam discs are arranged displaced relative to each other on the circumference of the switching shaft in such a way that either all of the knife levers, a certain number of the knife levers, or no knife lever is in engagement with a cam disc for adjusting the cutting length of the cutting device. This cutting device is in particular disadvantageous in that for actuation of the switching shaft and thus for adjustment of the cutting length such a great force expenditure is required that a direct manual rotation of the switching shaft by an operator is hardly possible. Instead, complex transmissions or other similar drive means are required.

In DE 32 13 199 C2, a loading trailer with a cutting device is disclosed in which the cutting knives that are projecting into the conveying channel are supported in their cutting position by means of support pawls which are mounted on a switching shaft in individual rows in axis-parallel orientation with different numbers of pawls, respectively. Support edges on the back of the cutting knives are supported with formation of an acute pressure angle on the support pawls of the switching shaft so that, when an excessive load occurs at one or several knives, the support pawls move out of the interaction area at the support edges of the cutting knives by rotation of the switching shaft, counter to the action of an overload protection device, and in this way a pivot movement of the cutting knives out of the cutting position into a non-cutting position is enabled. A disadvantage of this cutting device resides in that, when a stone or a similar foreign object impacts on one cutting knife, simultaneously all activated cutting knives are released to carry out a pivot movement out of the cutting position. A securing action of individual cutting knives against overload and damage is thus not possible.

EP 2 653 025 A1 discloses a further cutting device. It is characterized by a selection mechanism correlated with the tensioning units of the cutting knives; the selection mechanism can activate selected tensioning units from an inactive state, in which they are without engagement with the common adjusting device, into an active state in which they are in engagement with the common adjusting device. The common selection mechanism thus serves to move individual or all of the tensioning units between two states wherein the common adjusting device, depending on the state of the tensioning unit, is in engagement only with selected tensioning units so that only the latter must be moved by the common adjusting device, thus the required force expenditure is reduced. The actuation of the selection mechanism however requires an increased force expenditure due to the weight of the selected tensioning units that are lifted into the active state and due the friction resistances between the cams of the selection mechanism and the spiral springs of the tensioning units. In addition, the wear of the spiral springs at the contact locations with the cam has a negative effect on their service life, which is disadvantageous.

It is the object of the invention to provide an improved cutting device for agricultural harvesting machines of the aforementioned kind which in a compact configuration ensure a reliable securing action of each individual cutting knife, which can be produced inexpensively and simply, and in which an adjustment of the cutting length can be performed by an operator with a force expenditure that is as low as possible.

SUMMARY OF THE INVENTION

In accordance with the present invention, this is achieved for the cutting device of the aforementioned kind in that the preselecting device can be actuated with reduced force expenditure by eliminating resistances, caused by adjusting and/or connecting means of the knife switching device, during a preselecting movement of the preselecting device carried out to preselect the desired group of the cutting knives.

Further features of the cutting device of the invention are disclosed in the dependent claims.

In a cutting device for agricultural harvesting machine such as, for example, loading trailers (pick-up trailers) or bale presses, by use of the features according to the invention a cutting device is provided with which the operation is significantly facilitated, in particular because of the easy-moving comfortable operation of the pre-selecting device for selecting a group of knives, chosen for engagement and/or disengagement. Also, the cutting device according to the invention provides a reliable securing action of each individual cutting knife wherein the required mounting space is reduced to a minimum and, therefore, even in bale presses and in particular bale presses for producing square crop bales, the ground clearance is not impaired.

Due to the clever constructive configuration of the preselecting device of the cutting device according to the invention, it has been achieved that more than the maximally four switching positions as known from the prior art are now made possible. In an advantageous configuration of the cutting device according to the invention, five or even six switching positions of the preselecting device are possible without problem. Accordingly, in particular in a cutting device with a large number of knives several groups of knives can be formed. With this greater variation possibility, by using only some of the cutting knives, a significantly longer service life is possible before the cutting knives must be sharpened again.

According to the invention, it is has been recognized that for enabling a greater variation possibility of the preselecting device and an easy-moving operation thereof, the principal configuration of the knife switching device with the connected elements for knife actuation and securing action must be fundamentally reconsidered. According to the invention, the solution resides in that the knife switching device must perform the switching movement for adjustment of the preselected knives into the engagement or disengagement position not linearly but by pivoting about a pivot axis. Only in this way, within a smallest possible space, a knife switching device can be realized that fulfills the required demands and also fulfills further functions. The advantageously hydraulically driven pivot movement of the switching device makes obsolete complex, wear-prone switching linkages of the known linear drives. The particularly advantageous kinematic configuration of the tensioning device in combination with the pivotable switching device makes it possible that, in an operating position in which all cutting knives are switched off, i.e., are in an inoperative position, all elements of the knife switching device and of the tensioning device have no contact with the preselecting device. In this operating position, the preselecting device is free of any external influences and resistances caused by the knife switching device and is therefore very easily adjustable and therefore can be operated very comfortably by the operator.

In an advantageous embodiment, the preselecting device is designed as a hexagon shaft that extends across the entire width of the cutting device and is provided with switching discs (cam discs). The switching or cam discs provide depending on their position the stop for the tensioning lever of a knife. Due to the configuration of the switching discs (cam discs) and their rotated position relative to each other on the hexagon shaft of the preselecting device, different variation possibilities for switching various groups of the knives are made available. It is particularly advantageous that this configuration provides the possibility of a later change of the variations.

Further advantages of the pivotable switching device according to the invention result in that, upon pivoting of the switching device into the inoperative position, by mechanical contact with the tensioning levers, the latter and thus also all of the other adjusting and tensioning means are moved forcibly into the inoperative position. This advantageous additional function of the switching device increases the functional safety in particular relative to gravity-operated or spring-operated configurations, which configurations are subject to frequent disruptions since the area of the cutting device is heavily loaded with deposits of dirt and crop residues.

BRIEF DESCRIPTION OF THE DRAWING

The invention will be explained in the following with the aid of an embodiment shown in the drawings. Further details and advantages can be taken therefrom.

DESCRIPTION OF THE PREFERRED EMBODIMENTS

Figure 1:
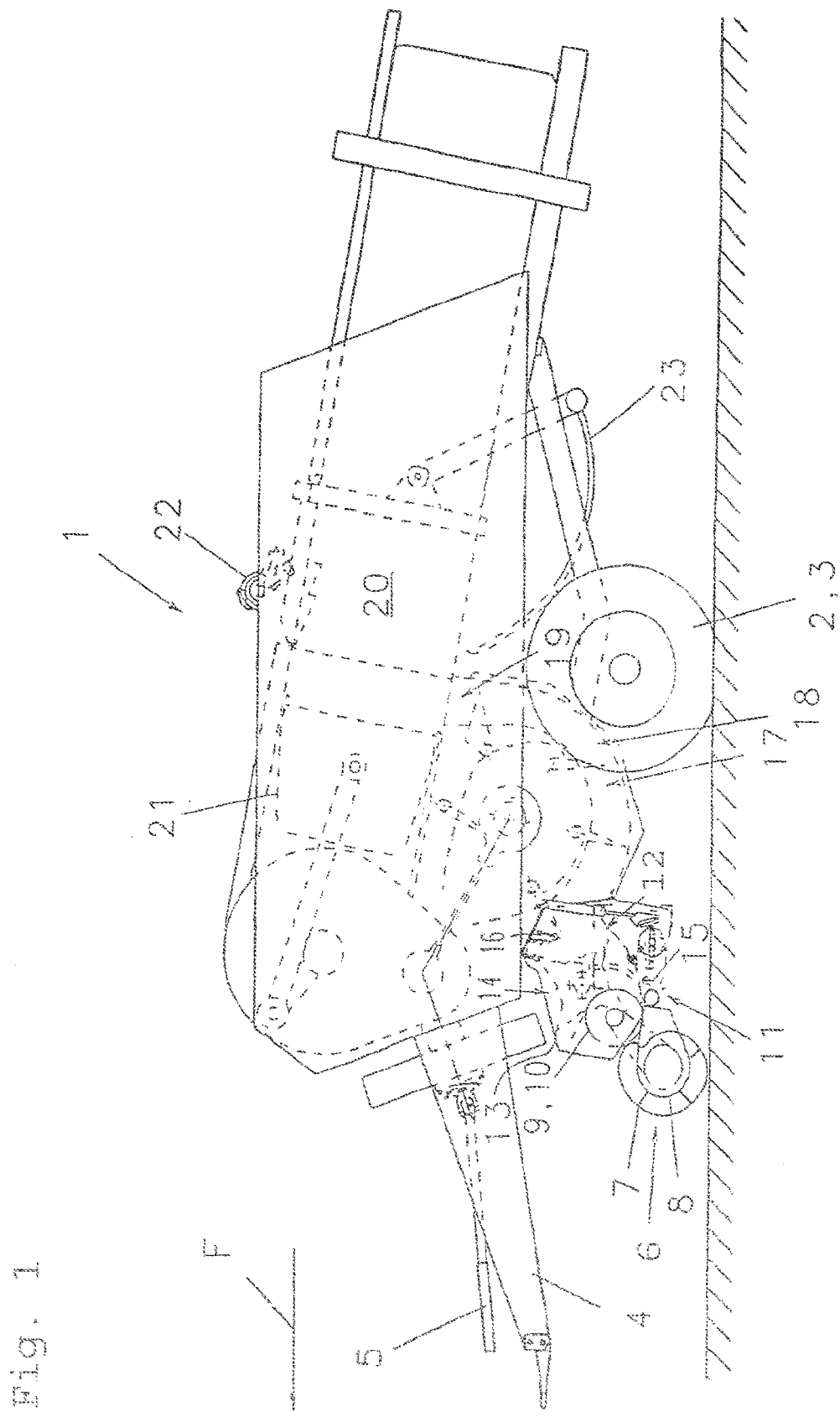
FIG. 1 is a side view of a bale press as a whole with a cutting device.

The bale press 1, illustrated in FIG. 1, is movable in the travel and working direction F across a field or a meadow and is supported on wheels 2, 3 relative to the ground. It is connectable by drawbar 4 with an agricultural tractor, not illustrated, wherein the drive action is realized by means of the power take-off of the tractor by means of a universal shaft 5. The bale press 1 comprises a pick-up device 6 by means of which the crop lying on the ground in swaths, for example, straw, hay or wilted green crop, can be picked up from the field or meadow. The pick-up device 6 in the illustrated embodiment is designed as a pick-up drum 8 of known configuration that is provided with tines 7. Transverse screw conveyors 9, 10 for reducing the width of the picked-up crop swath are associated with the pick-up drum 8. Downstream in the flow direction of the crop, a cutting device 11 adjoins the pick-up drum 8; the cutting device 11 is substantially comprised of a conveying member 14 embodied as a conveying and cutting rotor with conveying tines 13 protruding into a conveying channel 12, cutting knives 15, and strippers 16 arranged between the cutting knives 15. Downstream of the cutting device 11, the crop is conveyed by action of a conveying device 17 designed as a rake conveyor through a feed channel 18 and a pressing channel inlet opening 19 from below into the pressing channel 20 in which a reciprocating pressing piston 21 compresses the crop to dense square (parallelepipedal) bales. When a preselected length of the crop bales is reached, the bales are tied by tying material. For this purpose, only schematically indicated knotting devices 22 with respectively associated tying needles 23 are provided. In the illustrated embodiment, the cutting device 11 according to the invention is used on a bale press for producing square (parallelepipedal) crop bales. However, it is likewise also conceivable to employ the cutting device 11 according to the invention in a bale press for producing round bales or in a self-loading trailer.

Figure 2:
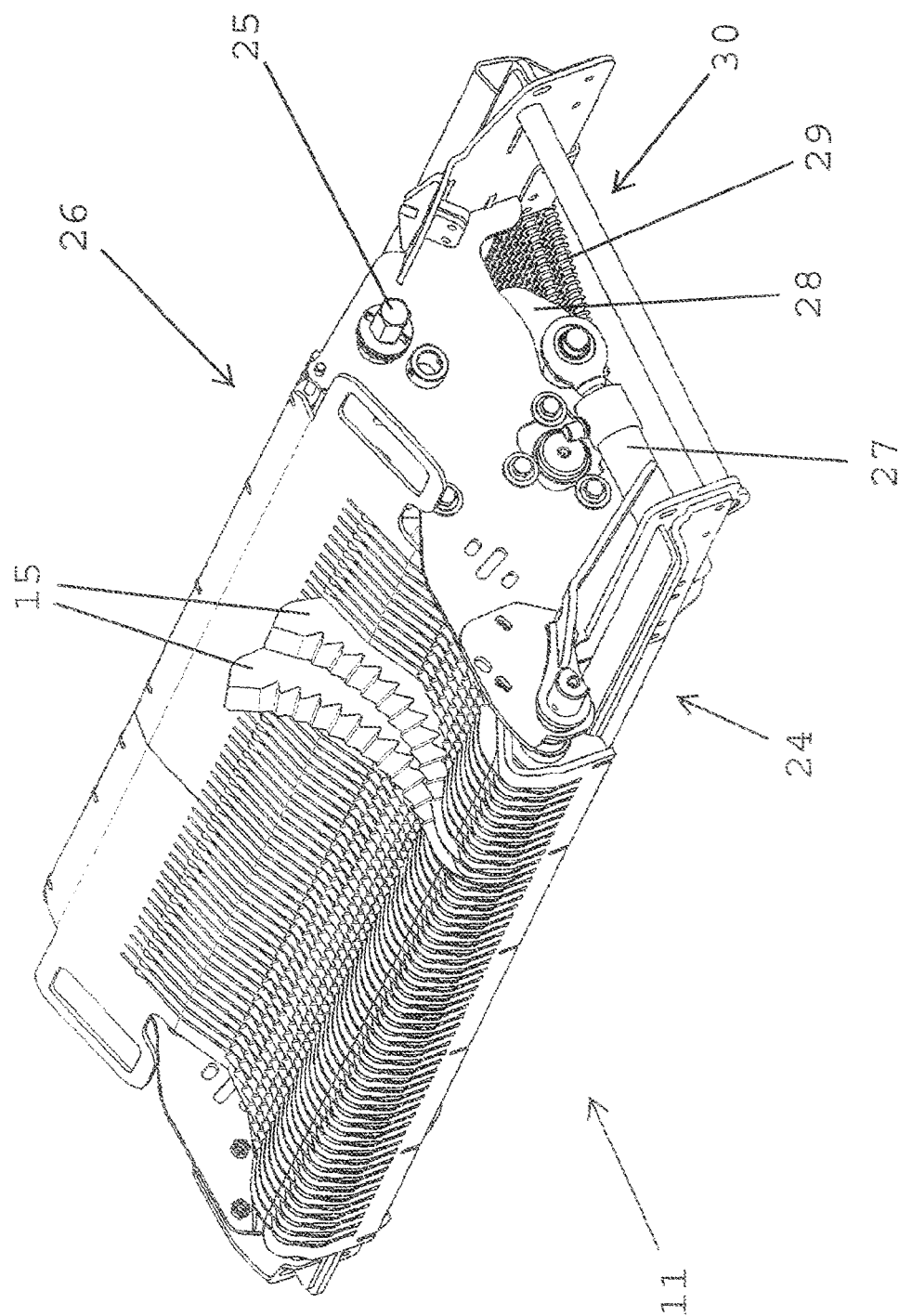
FIG. 2 is a perspective view of the cutting device according to the invention with surrounding components removed.

In FIG. 2, the cutting device 11 according to the invention is illustrated in more detail in a perspective enlarged illustration. The cutting device 11 of the embodiment as a whole is advantageously mounted on a frame 24 which, guided on guides of the bale press 1, can be pulled laterally out of the bale press 1 for servicing purposes. Clearly shown are two cutting knives 15 which, for illustration purposes, are illustrated in a completely extended pivoted operating position and in an intermediate position. The other cutting knives 15 of this cutting device 11 that is provided with very many knives are in the retracted pivoted inoperative position. The connector of the hexagon shaft 25 for the actuating lever of the preselecting device 26 is clearly shown as is the adjusting cylinder 27 of the knife switching device 28 and the spiral springs 29 of the tensioning devices 30.

Figure 3:
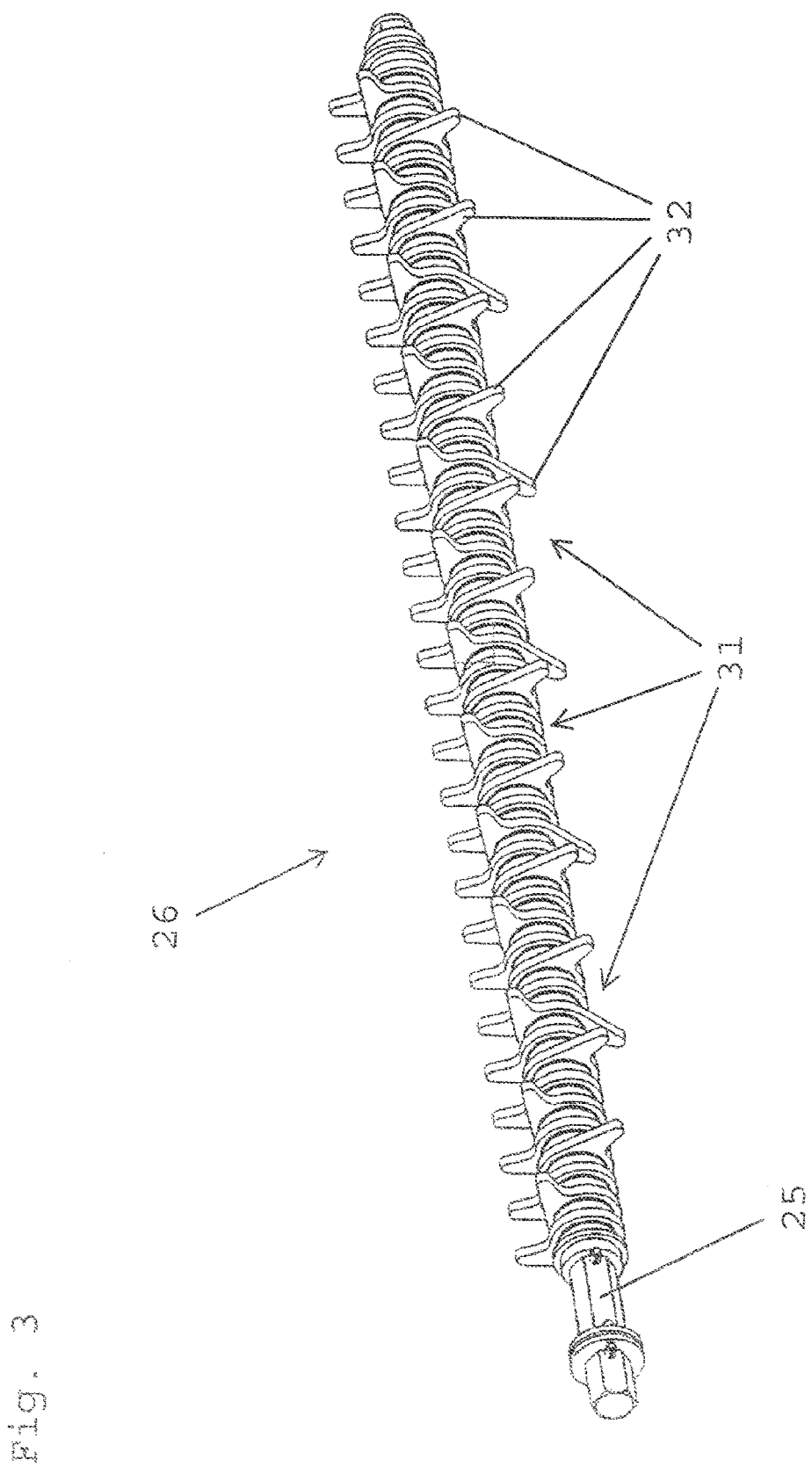
FIG. 3 is a perspective individual representation of the preselecting device of the cutting device according to FIG. 2.

FIG. 3 shows in detail the preselecting device 26 comprised of switching discs 31 pushed onto the hexagon shaft 25 and in regard to their number and spacing are corresponding exactly to the number and spacing of the cutting knives 15 and thus extend across the entire width of the cutting device 11. The switching discs 31 have contact cams 32 which will be explained in detail in the following.

Figure 4:
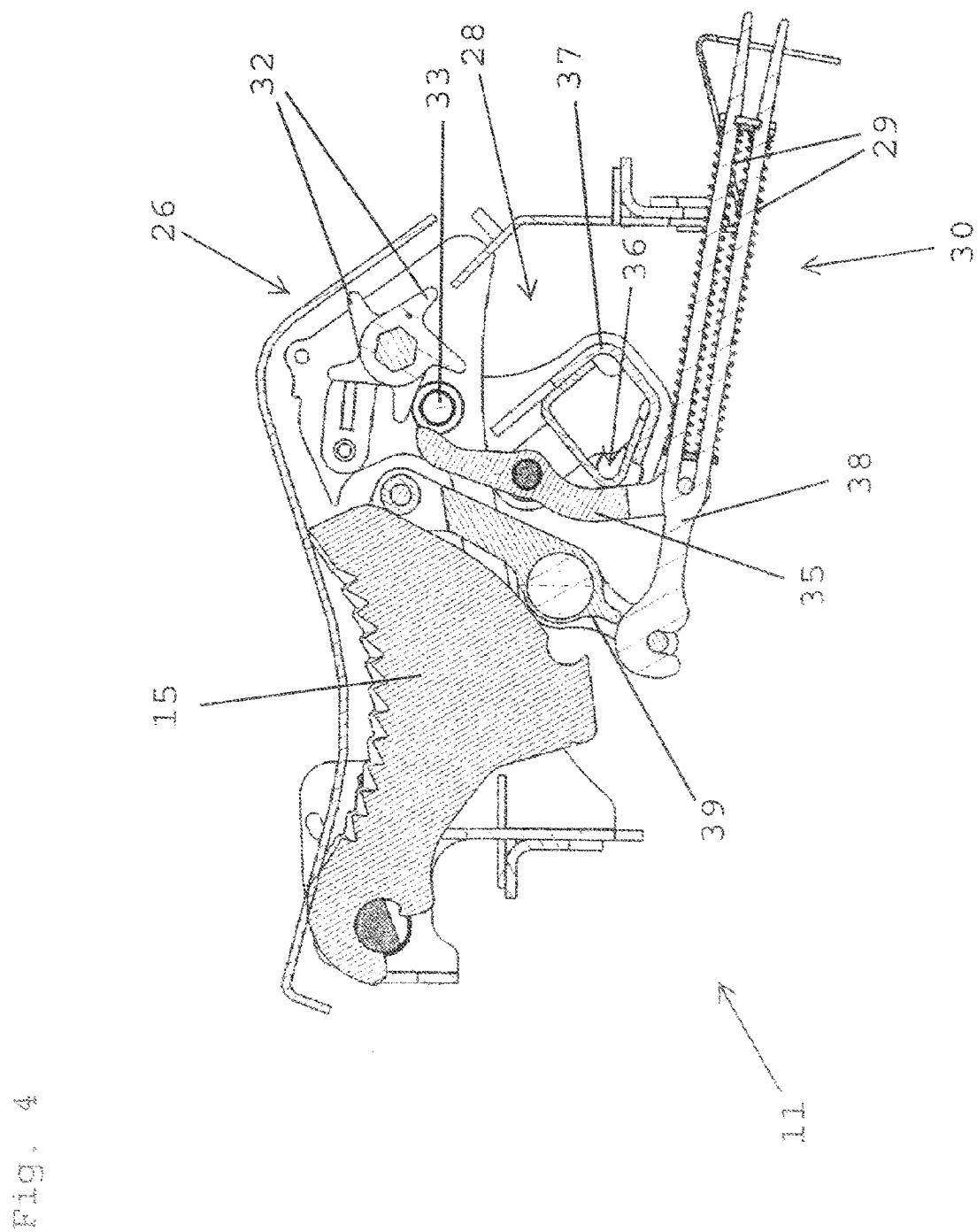
FIG. 4 is a side view of the cutting device according to FIG. 2 in section illustration, wherein the cutting device is in inoperative position.

FIG. 4 shows in a side view a section illustration of the cutting device 11. In this illustration, the different component groups and components of the cutting device 11 can be seen particularly well. FIG. 4 shows the cutting device 11 in its inoperative position. The knife switching device 28 has been pivoted about its pivot axis 33 in downward direction by retracting the adjusting cylinder 27 so that at the same time the pivot axis 34 of the tensioning lever 35 has been moved such that the upper free end of the tensioning lever 35 is located outside of the active area (circumcircle diameter) of the contact cam 32. Accordingly, in this position, the preselecting device 26 can be rotated easily in one direction without forces having to be overcome that would be acting on it through the tensioning levers 35, for example, by the spiral springs 29 of tensioning units 30. During pivoting of the knife switching device 28 into the inoperative position, the contact edge 36 of the transverse beam 37 of the knife switching device 28 has been moved against the tensioning levers 35 in the area below the pivot axis 34 and this effects forcibly, due to the connection of the tensioning levers 35 with the forks 38 of the tensioning units 30, the return pivot movement of the adjusting lever 39 which, in turn, causes the cutting knives 15 to dip into their inactive position.

Figure 5:
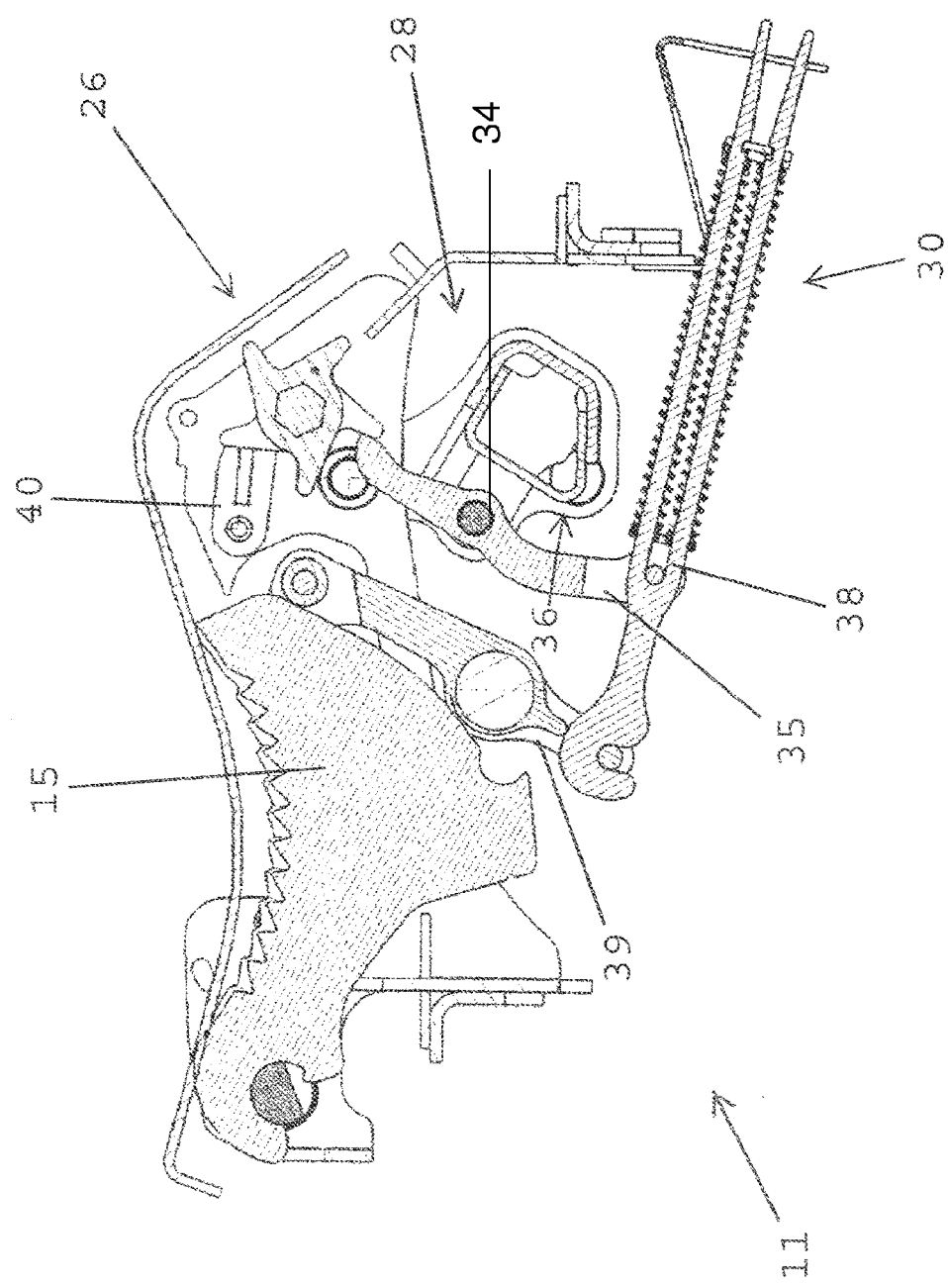
FIG. 5 is a side view as in FIG. 4 wherein, however, the transition from the inoperative position to the operative position (active cutting position) of the cutting device is illustrated.
Figure 6:
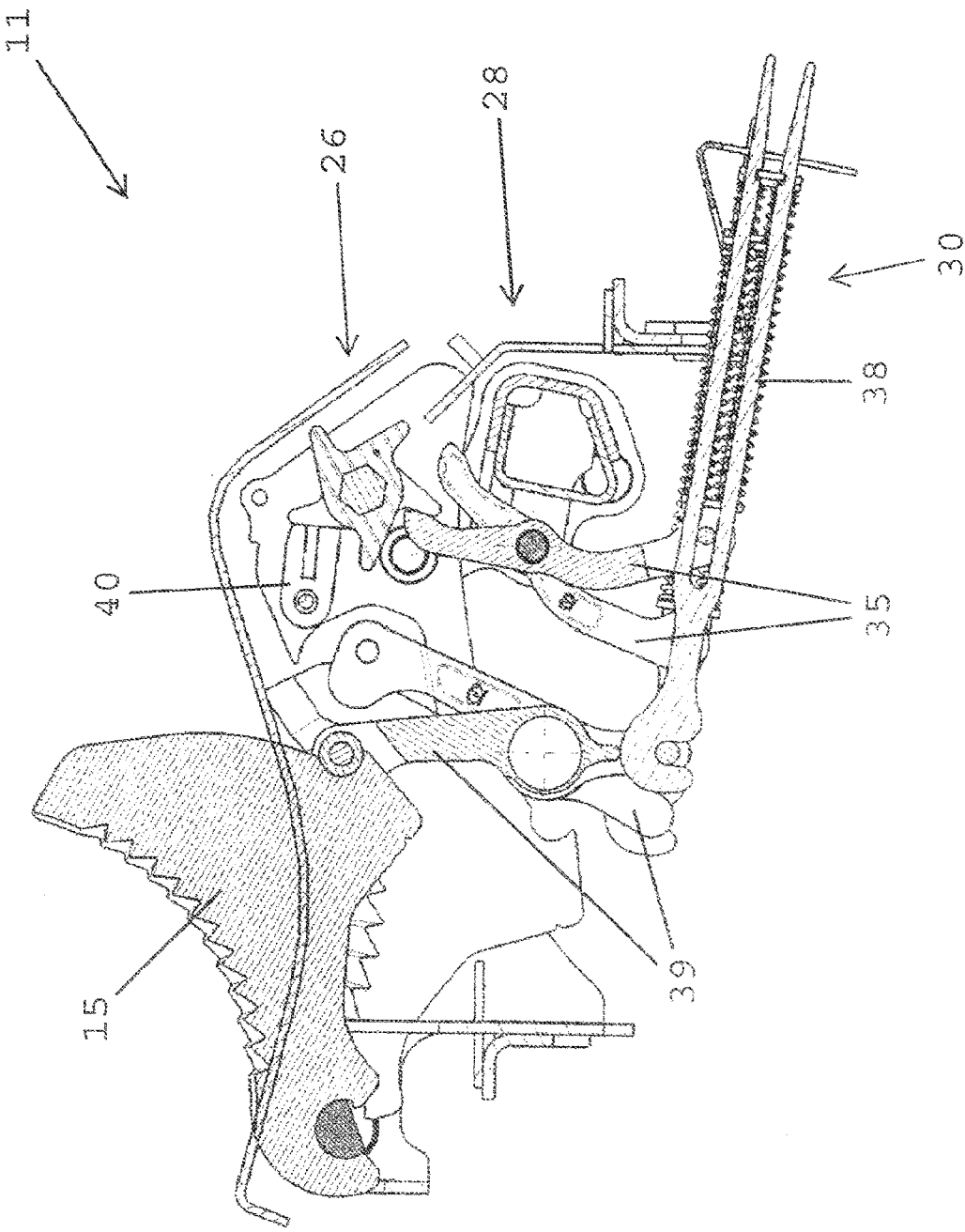
FIG. 6 is a side view as in FIG. 4 wherein, however, the operative position of the cutting device is illustrated.

The additional FIGS. 5 and 6 show in the same view as FIG. 4 the embodiment of the cutting device 11 according to the invention in further operating positions.

FIG. 5 represents the intermediate position during the switching process of the knife switching device 28 from the inoperative position (FIG. 4) into the operative (active cutting) position (FIG. 6) of the cutting device 11. By making a preselection, one or more contact cams 32 of the switching discs 31 of the preselecting device 26 are positioned opposite selected tensioning levers 35. The knife switching device 28 is then pivoted in counterclockwise direction so far about the pivot axis 33 that the tensioning levers 35 come to rest at the preselected contact cams 32. Upon further pivoting of the knife switching device 28, the pivot axis 34 of the tensioning levers 35 is moved also. This causes the tensioning levers 35, which are contacting the contact cams 32 with their upper end, to perform a movement of their lower end which is connected with the fork 38 of the tensioning unit 30 so that the tensioning unit 30 is pretensioned and the correlated cutting knife 15 is switched by means of the connected adjusting lever 39 into its active cutting position (FIG. 6).

The tensioning levers 35 that are not in contact with a contact cam 32 of the preselecting device 26 move during this process below the preselecting device 26 into the empty space and cause no pretensioning of the tensioning units 30.

In order to prevent rotation of the preselecting device 26, the latter is supported against a pivotable locking bar 40 which, upon rotation of the preselecting device 26 in clockwise direction for preselecting a group of knives 15, is lifted by the contact cams 32 and is returned by gravity into the arresting position.

In FIG. 6, the end position of the switching process for activation of the preselected cutting knives 15 are illustrated. The selected cutting knives 15 are in the operative position (active cutting position) and are secured by spring pressure of the corresponding tensioning unit 30 relative to the correlated adjusting lever 39. In FIG. 6, the adjusting elements 35, 39 of the inactive cutting knives 15 are shown clearly in their inoperative position. Advantageously, in the cutting device 11 according to the invention, as can be seen in FIG. 6, the inactive tensioning units 30 remain completely unloaded in the operative position of the cutting device 11. Also, it is apparent that the pivot movement of the knife switching device 28 which provides simultaneously several functions is particularly advantageously in regard to the compact configuration of the cutting device 11 according to the invention.

The cutting knives 15 have a spacing relative to each other that defines the shortest theoretical section length of the crop when cut by the cutting knives and the shortest theoretical section length is in a range from 15 mm to 45 mm, preferably in a range from 15 mm to 25 mm.

The specification incorporates by reference the entire disclosure of German priority document 20 2014 006 083.5 having a filing date of Jul. 30, 2014.

While specific embodiments of the invention have been shown and described in detail to illustrate the inventive principles, it will be understood that the invention may be embodied otherwise without departing from such principles.

What is claimed is:

1. A cutting device for agricultural harvesting machines, the cutting device comprising
a conveying channel;
cutting knives arranged in at least one row adjacent to each other on a frame and pivotably supported on the frame, wherein the cutting knives comprise an active cutting position and an inoperative position, wherein, in the active cutting position, the cutting knives project into the conveying channel;
a conveying member arranged at the conveying channel and configured to be rotatingly driven about a horizontal axis oriented transverse to a travel and working direction of the cutting device, wherein the conveying member comprises conveying tines;
the cutting knives and the conveying member interacting with each other for comminuting a crop;
individual adjusting devices, each associated with one of the cutting knives, respectively, and each comprising a tensioning device configured to yieldingly support the cutting knives individually in the active cutting position;
a knife switching device operatively connected to the cutting knives so as to move the cutting knives from the inoperative position into the active cutting position;
a preselecting device configured to preselect a desired group of the cutting knives, the desired group of the cutting knives pivoted into the active cutting position upon activation of the knife switching device;
wherein the cutting device has an inoperative position, wherein in the inoperative position of the cutting device the preselecting device is configured to be activated with reduced force expenditure by decoupling the preselecting device from the knife switching device and from the tensioning devices during a preselecting movement of the preselecting device carried out to preselect the desired group of the cutting knives so that the preselecting device is free of forces caused by the knife switching device and the tensioning devices.

2. The cutting device according to claim 1, wherein the knife switching device carries out a pivot movement when actuated.

3. The cutting device according to claim 1, wherein the knife switching device, when actuated, at least temporarily performs during its movement course additional forcibly guided functions by mechanical contact of a contact edge of the knife switching device with parts of the tensioning devices.

4. The cutting device according to claim 1, wherein the preselecting device comprises at least five switching positions.

5. The cutting device according to claim 1, wherein the preselecting device is a switching shaft with cams.

6. The cutting device according to claim 1, wherein the preselecting device comprises individual preselecting devices, each associated with one of the cutting knives.

7. The cutting device according to claim 5, wherein the individual preselecting devices are cam discs provided with contact cams.

8. The cutting device according to claim 7, wherein the cams discs are variably supported on a profiled shaft.

9. The cutting device according to claim 1, wherein the cutting knives have a spacing relative to each other and the spacing defines the shortest theoretical section length of the crop when cut by the cutting knives and the shortest theoretical section length is in a range from 15 mm to 45 mm.

10. The cutting device according to claim 9, wherein the spacing and the shortest theoretical cutting length of the crop is in a range from 15 mm to 25 mm.

* * * * *